INVENTOR:
Dick R. Herman

BY Herbert E. Metcalf
His Patent Attorney

Dec. 20, 1955           D. R. HERMAN           2,727,428
MEANS FOR PHOTOGRAPHING A PATH OF GREATER LINEAR DIMENSION
THAN THAT OF THE CAMERA FIELD OF VIEW
Original Filed Nov. 13, 1948           3 Sheets-Sheet 3

INVENTOR
Dick R. Herman
By Herbert E. Metcalf
His Patent Attorney

United States Patent Office 2,727,428
Patented Dec. 20, 1955

2,727,428

MEANS FOR PHOTOGRAPHING A PATH OF GREATER LINEAR DIMENSION THAN THAT OF THE CAMERA FIELD OF VIEW

Dick R. Herman, Los Angeles, Calif., assignor to Northrop Aircraft, Inc., Hawthorne, Calif., a corporation of California Original application November 13, 1948, Serial No. 59,803, now Patent No. 2,618,195, dated November 18, 1952. Divided and this application September 29, 1952, Serial No. 312,006

2 Claims. (Cl. 88—16)

This invention relates to photography, and more particularly to a means for photographing the entire length of a long line or course from a stationary camera set-up, and is a division of my earlier application Serial No. 59,803, filed November 13, 1948, now Patent No. 2,618,195 issued November 18, 1952.

In conducting any kind of an experiment from which data is to be used for future design purposes, means must be devised to obtain this data, together with its proper recording. In many cases, observations are made by means of motion picture cameras, to form a permanent record of events. This method is especially useful in noting the various physical characteristics of the parts undergoing tests, since all visible results will be immediately photographed as they occur, however temporary may be their duration. Thus, for example, velocities may be accurately determined by photographing the passage of an object over a marked course, when properly correlated with time intervals.

If the entire action required to be covered in this manner takes place substantially within the field of view of the camera, satisfactory results can be obtained. However, if a straight-line course of some length is involved, the photographic coverage becomes more difficult because the camera must be moved about or "panned" during the operating period of the object in motion. When photographing the entire run of a very high speed object under test, it becomes increasingly difficult to keep the object in the field of view by this panning movement.

It is the object of this invention to enable a much greater length of scope to be covered by a camera than is normally provided by the direct field of view of the camera alone. This will make it possible to project onto the camera film a view of a relatively long course or track while the camera remains at one stationary position, so that no panning movement is required to cover the entire course.

In broad terms, the present invention comprises a camera viewing a bank of strip mirrors placed one above the other in the picture frame and independently adjusted so that a different portion of a course or track is seen in each mirror.

The invention may be more fully understood by reference to the accompanying drawings and the following description of a specific apparatus utilizing this novel method. It is to be understood that this method is applicable to other apparatus, and that this invention is not limited in any way to the specific apparatus shown herein, since other apparatus embodiments may be adopted within the scope of the appended claims.

Figure 1:
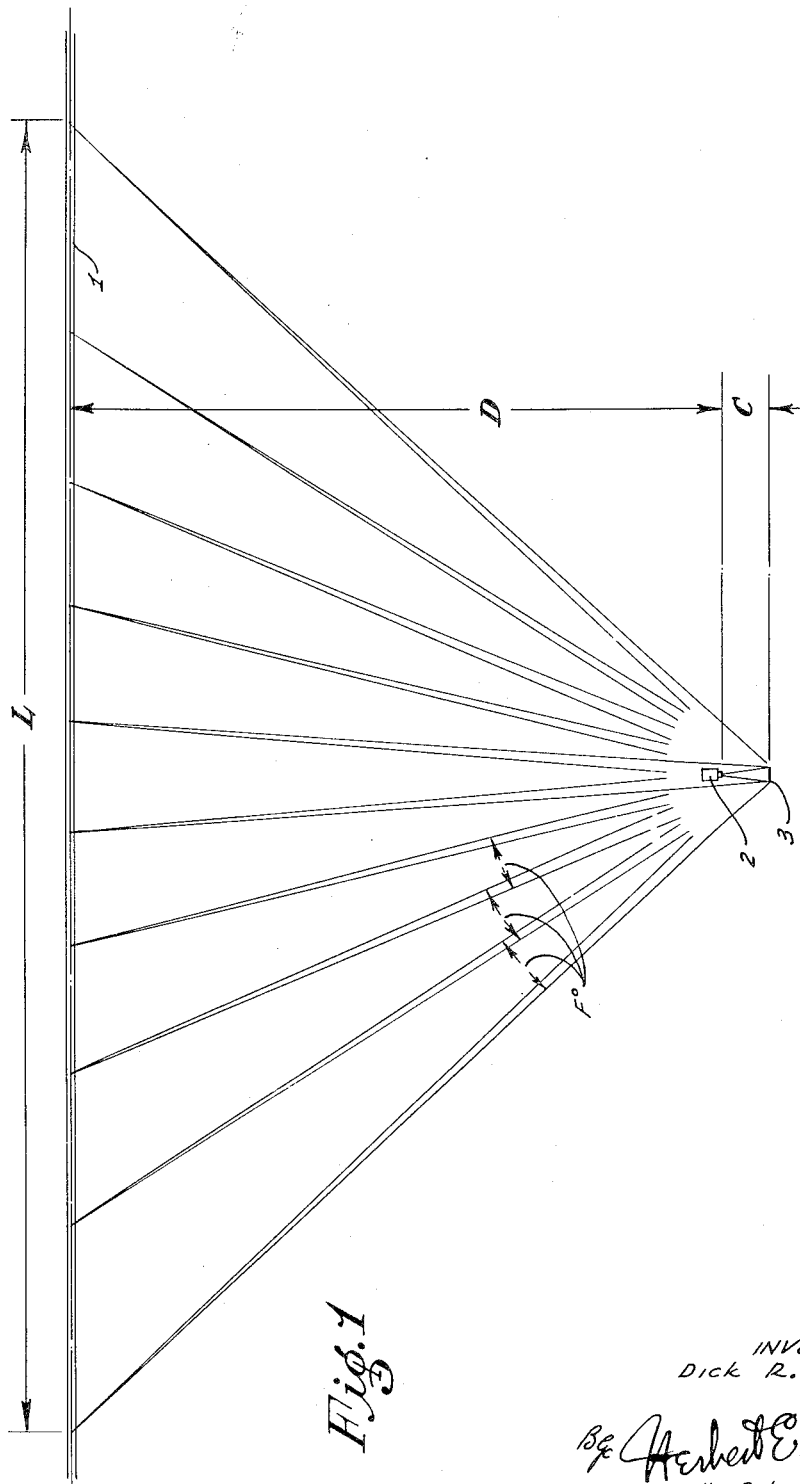
Figure 1 is a plan view showing a long track and a camera location for photographing all portions of the track on each frame of film.
Figure 2:
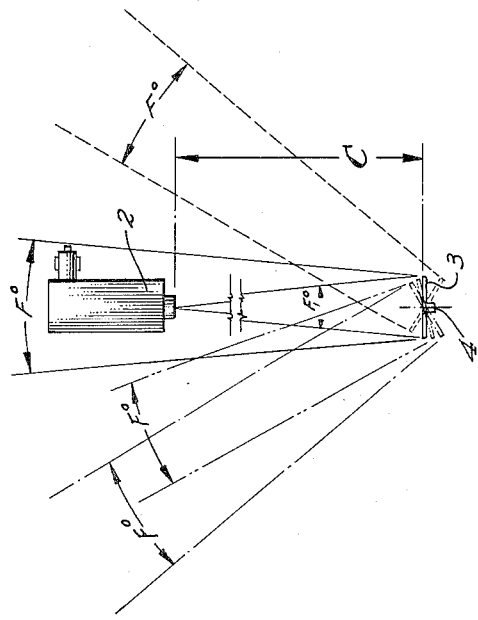
Figure 2 is a plan view on a larger scale than that of Figure 1, showing the camera, a mirror set-up, and horizontal reflection angles.

Referring first to Figures 1 and 2, a track 1 extends along the ground in a straight line for a length L. Located roughly equi-distant from the ends of the track 1 and at a distance D from the track is a motion picture camera 2 of the high speed, continuous film drive type pointing away from the track 1 and viewing a series of nine mirror assemblies 3 mounted on a mirror post 4. The mirror assemblies 3 are separated from the camera 2 by a distance C, and both the camera and the mirror post 4 are mounted on a teeter stand 5, as may best be seen in Figure 3. Each mirror assembly 3 (Figure 4) includes a hub 6 rotatably mounted on the post 4, a mirror channel 7, and a front-silvered plane mirror 8 about 1½ inches wide by 21 inches long mounted on the channel 7. The mirror assemblies 3 are placed one above another with their edges nearly touching.

The camera 2 position relative to the mirrors 8 is adjusted so that the total area of the mirrors is centered in the field of view of the camera. The teeter stand 5 is then adjusted so that the center of the track 1 is visible as seen from the camera 2 to the center mirror and over the top of the camera. In other words, the camera itself must not block the view of the track directly behind the camera.

Figure 4:
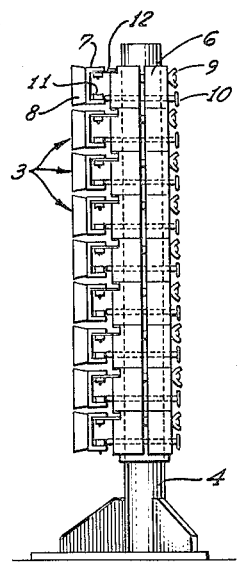
Figure 4 is a side view of the mirror set-up in Figure 3, showing details of mirror arrangement and adjustment.

For individual adjustment, each mirror assembly 3, as shown in Figure 4, may be rotated in a horizontal plane about the mirror post 4, and the hub 6 clamped tightly by means of a thumb screw 9 installed in each hub. Vertical adjustment is accomplished by an adjusting screw 10 through each hub 6 which bears on a pad 11 at the bottom edge of the mirror channel 7. The mirror channel is supported at its upper edge by a leaf spring 12 which keeps the lower edge pad 11 always in contact with the adjusting screw 10 so that turning of the adjusting screw 10 will incline the mirror 8 toward or from the vertical.

With these two adjustments, the top mirror is aligned to cover the track 1 from the starting end to the limit of the mirror in the lengthwise direction along the track 1. The second mirror is then aligned to cover the next portion of track from where the view in the top, or first, mirror left off. Continuing in this manner, each succeeding mirror is set to view the next length of track, ending with the bottom mirror viewing the finish end of the track.

Figure 3:
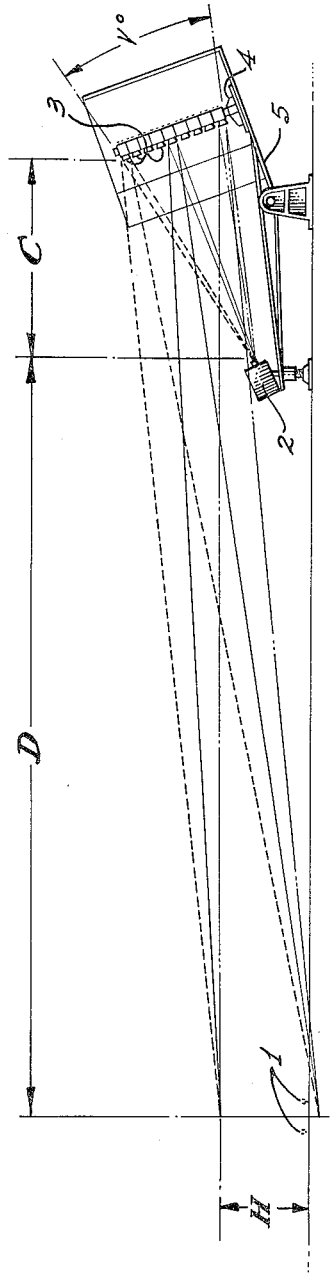
Figure 3 is a cross-track view, not drawn to scale, showing the vertical optical paths from camera to track.

With the camera operating, an object moving from the starting end to the finish end will appear on the film, first at the left end of the top mirror of the first frames, then, progressing from left to right across the following horizontal mirrors in order, appear last at the right end of the bottom mirror of the latter frames. The finished film may be used in a projector or printed to obtain still shots. Figures 1, 2, and 3 show details of both the horizontal and vertical coverages. Adjacent mirrors may overlap the view a slight amount, if desired, but this is not necessary.

In one particular set-up, the following approximate quantitative values were involved. Track length L was 1,850 feet, camera distance D from the track was 900 feet, and mirror distance C from the camera was 12 to 14 feet. A 16 mm. high-speed camera was used, with an f/2.7, 63 mm. lens. The camera was set to operate at a maximum speed of about 1,500 frames per second, and a 100-foot reel of film was used. A timing arrangement was provided in the camera to mark a time trace at one edge of the film every .01 second. This was to insure accurate timing, since a substantial amount of film footage is used up as the camera approaches its top speed; therefore, the film speed during the operational period would not be constant and cannot be used in computation.

The horizontal field of view F (Figures 1 and 2) for this camera and lens combination is approximately 10 degrees, while the vertical field of view V (Figure 3) is about 7 degrees. As a result, there was practically no overlapping of the view from one mirror to the next, and the vertical coverage H at the track (Figure 3) was about 12 feet.

Consistent with size and shape of object, length of run, and other considerations, the camera may be located at any desired spot, since the mirrors are individually adjusted. Also, more or less than nine mirrors may be used. Larger film will produce larger pictures, but any size may be used, and any camera suitable for the purpose of each case may be used.

Figure 5:
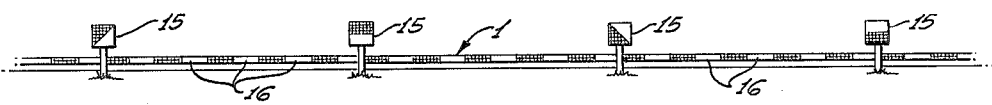
Figure 5 is a side view of a portion of the track, showing distance markers positioned therealong.

Figure 5 shows distance markers 15 erected along the track 1. These markers, for the example given, may be positioned every 50 feet along the track and are preferably marked differently so that each one indicates its total distance from the start. In addition, painted strips 16 may be provided at any desired portion of the track, or for its entire length. These strips 16, for example, may be 5 feet long with 5-foot spaces between strips. Velocity at any point may be computed by noting a short distance traveled and the time taken to cover this distance.

Figure 6:
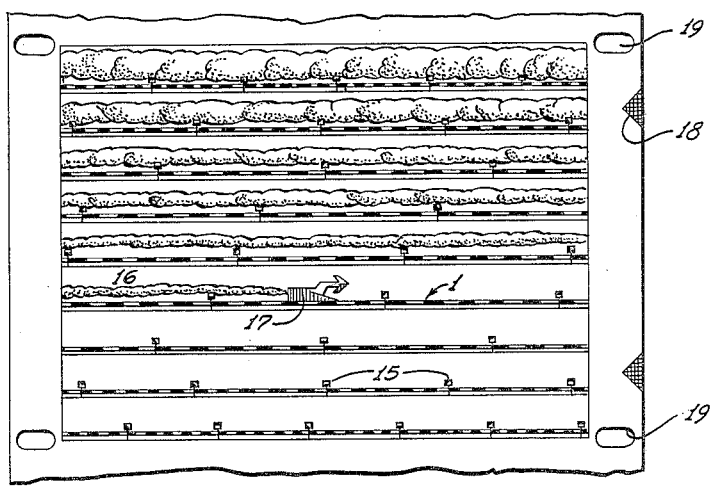
Figure 6 is a reproduction of one frame of film after exposure, showing results obtained from the embodiment as described herein when used to photograph a rocket driven high speed sled.

An example of the film coverage obtained from the above-described embodiment is shown in Figure 6. This is an enlarged reproduction of one frame of the 16 mm. film, showing nine horizontal sections each corresponding to one of the nine strip mirrors 8, a fast-moving object 17, track 1, 50-foot track markers 15, 5-foot track strips 16, and a time pulse 18 which appears as a dark spot along one edge of the film between the sprocket holes 19. The fast-moving object 17 pictured in Figure 6 is one design of a vehicle shown and described in a co-pending application entitled High Speed Landcraft, Serial No. 47,914, filed September 4, 1948, capable of moving over the track at velocities on the order of 1,000 M. P. H.

It will be obvious to those skilled in the art that many uses present themselves for this invention, such as photographing races of many kinds, projectiles, or high speed vehicles carrying models of various types, for example. The present invention is, therefore, not limited to the embodiment herein described, since it is capable of a variety of uses.

What is claimed is:

1. Means for photographically recording the speed of an object travelling along a predetermined path in the field of view of a movie camera and over a greater distance than that which can be photographed as an undivided image of said path on the sensitized film in the camera, comprising a support mounted on the ground; an extended member supported in an inclined manner on said support in a direction normal to the extent of the path and with its lower end toward the path; a movie camera mounted on the lower end of said extended member with the lens of the camera directed toward the opposite end of the extended member; an upwardly extending supporting member mounted toward the end of said extended member spaced from said camera; a plurality of mirrors mounted in superposed relation on said supporting member and angularly adjustable thereon to cover the reflected field of view of the camera onto the sensitized film therein in superposed and strict sequential relation.

2. Means for photographing on a single film frame a scene having a long dimension substantially greater than the width of the field of view of a camera, comprising: a bank of adjustable strip mirrors facing the scene; a camera facing said bank and positioned between the latter and the scene, said mirrors being adjusted to reflect onto one film frame of said camera in superposed sequential arrangement substantially consecutive portions along the length of the scene, each of a length at least as small as the width of the field of view of said camera; and a support mounting said bank and said camera.

References Cited in the file of this patent

UNITED STATES PATENTS

| | | |
|---|---|---|
| 1,424,886 | Douglass | Aug. 8, 1922 |
| 2,094,983 | Harding | Oct. 5, 1937 |
| 2,207,236 | Uden | July 9, 1940 |

FOREIGN PATENTS

| | | |
|---|---|---|
| 611,746 | France | July 17, 1926 |